(No Model.) 2 Sheets—Sheet 1.

R. WOOD.
AUTOMATIC VALVE.

No. 470,735. Patented Mar. 15, 1892.

Witnesses
H. A. Carhart
E. J. Mack

Inventor
Robert Wood
By his Attorneys
Smith & Denison

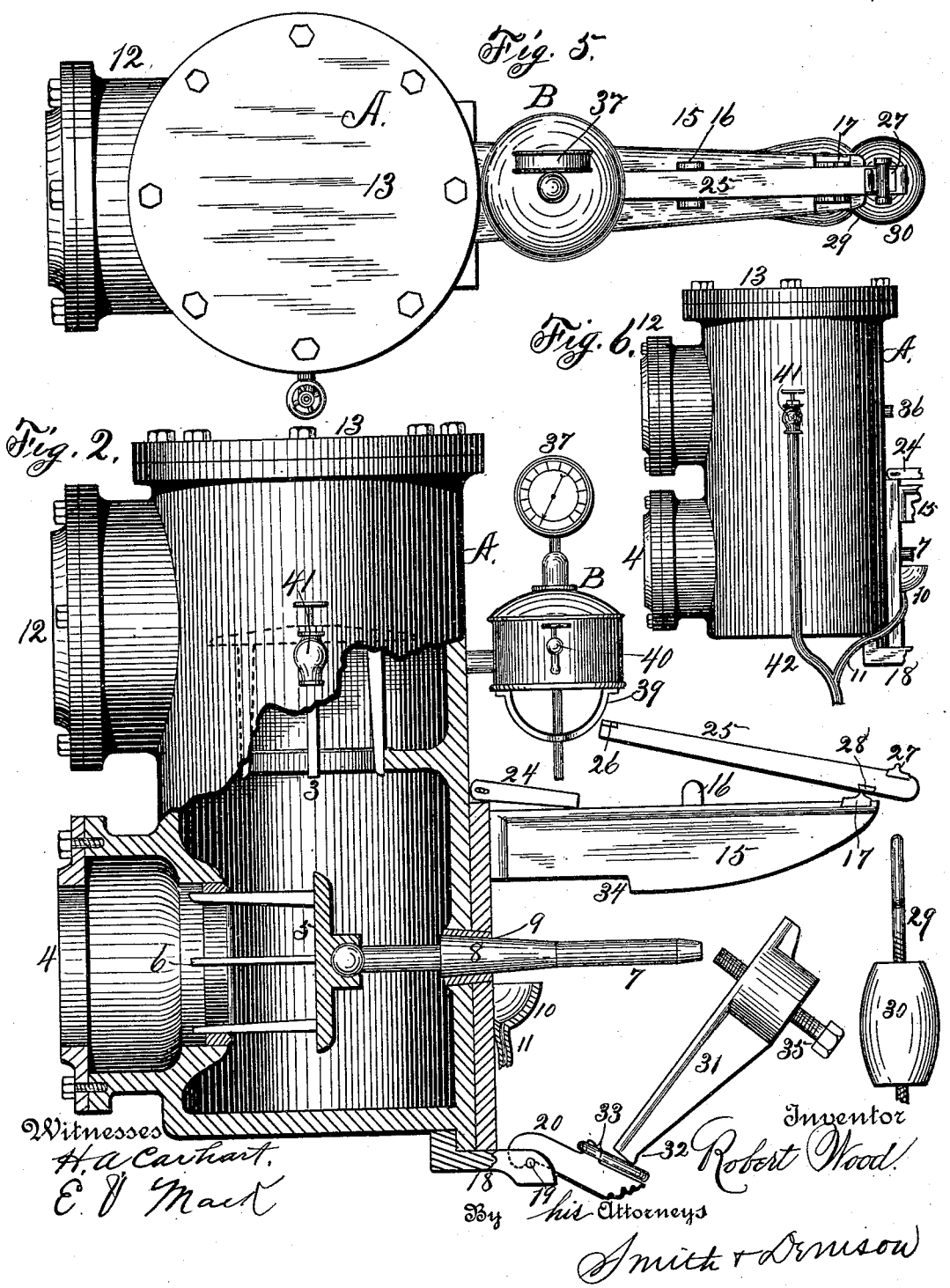

UNITED STATES PATENT OFFICE.

ROBERT WOOD, OF SYRACUSE, NEW YORK.

AUTOMATIC VALVE.

SPECIFICATION forming part of Letters Patent No. 470,735, dated March 15, 1892.

Application filed December 15, 1890. Serial No. 374,693. (No model.)

*To all whom it may concern:*

Be it known that I, ROBERT WOOD, of Syracuse, in the county of Onondaga, in the State of New York, have invented new and useful Improvements in Automatic Valves, of which the following, taken in connection with the accompanying drawings, is a full, clear, and exact description.

My invention relates to devices and valvular apparatus for holding back the main supply of water from the piping system of a sprinkler apparatus for extinguishing fires and for automatically opening the main valve to let on the water, whether used in connection with either a wet or dry piping system or with or without filling the pipes with compressed air.

My object is to produce an automatic valve for holding back and letting on the water to a piping system with improved adjuncts and retaining and releasing mechanisms, which will insure perfect operation of the valve through the air or other pressure in the pipes acting upon a lever system operating to hold the valve closed and automatically releasing it as soon as such pressure is reduced below a certain point, means being also provided to drain off the water which may accumulate from leakage into the valve-chamber and to automatically close the drainage-aperture by the opening of the valve, and means being also provided to draw off all water which may be in or may accumulate in the piping system, means being also provided to guide the main valve in closing, to guide the water-valve between the main-valve chamber and the piping, and to regulate the extent of its opening, and means being also provided to prevent corrosion of the lever-bearings.

My invention consists in the several novel features of construction and operation hereinafter described, and which are specifically set forth in the claims hereunto annexed. It is constructed as follows, reference being had to the accompanying drawings, in which—

Figure 1:
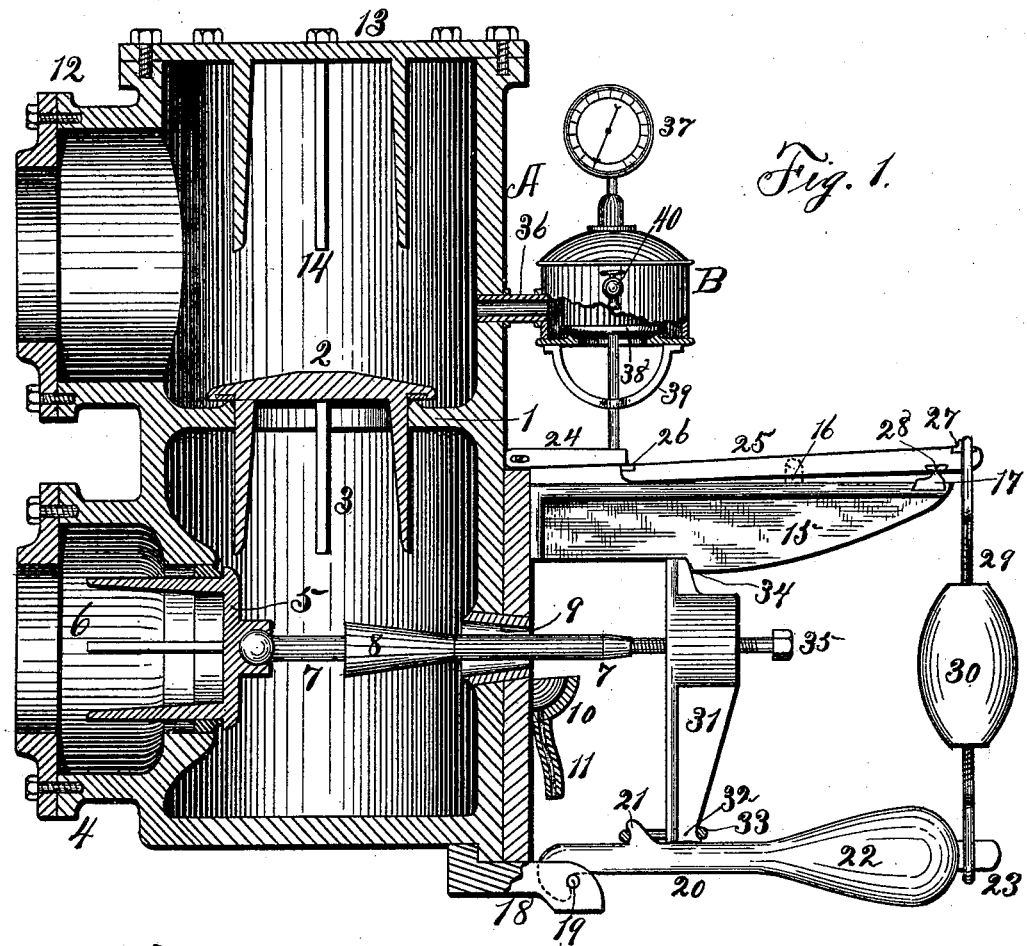
Figure 3:
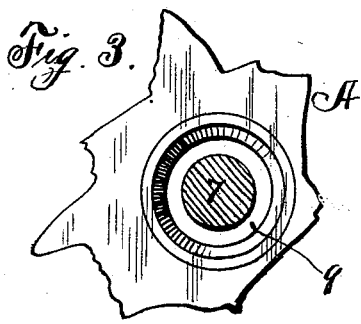
Figure 4:
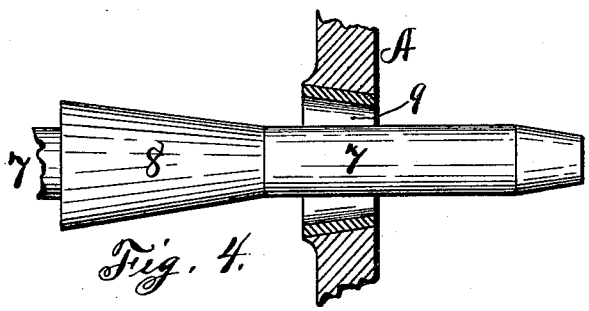

Figure 1 is a vertical transverse section of the valve-body, the inlet and outlet openings, and the valves, the drip opening or passage, showing, also, in elevation the main-valve stem and the weighted lever system or mechanism in position and connected as when holding the main valve closed, and in sectional elevation the piston mechanism bearing upon and holding said lever system closed and its connection to the air-chamber in the valve-body. Fig. 2 is a sectional elevation of the same parts shown in Fig. 1, showing the water-valve and the air-pressure valve both open, the water let on, and the parts of the lever system all disconnected, and the drip opening or passage surrounding the stem closed by the tapering bar or valve-stem of the water-valve. Fig. 3 is a plan view of the inner face of the water-chamber casing, showing the drip opening or passage therein and the valve-stem supported independently of the drip opening or passage, so as to form an annular channel around the stem for the free exit of water while the main valve is closed. Fig. 4 is a section of that part of the casing shown in Fig. 3, showing, also, in elevation a part of the stem of the water-valve through the drip opening or passage and in the position relatively as when the water-valve is closed and the drip opening or passage is open. Fig. 5 is a top plan view. Fig. 6 is an elevation of the casing, showing the drip-pipe and the pipe and globe-valve for drawing off the water from the whole piping system or such as may accumulate therein from condensation.

A is the casing, closed at the ends, as shown, provided with a diaphragm 1, centrally perforated to provide a valve-opening. This diaphragm creates two chambers, and for perspicuity I style the upper one the "air-chamber" and the lower one the "water-chamber." A valve 2, properly seated, closes the opening through the diaphragm. This valve is provided with fingers 3, dependent from its lower face, and they serve to guide the valve in opening and to its seat as it is being closed. The inlet-pipe from the water-main or other supply is coupled onto the tubular offset 4, which opens inwardly into the water-chamber, and 5 is the shut-off and inlet main valve, properly seated and also provided with guide-fingers 6 to guide it in opening and to support it in open position and to guide it to its seat to shut off the water. A valve-stem 7 is loosely connected to this valve by means of a ball-and-socket joint, as shown, or in any other manner desired, and 8 is a tapering or frusto-conical bar or valve upon or integral with the stem, and the stem projects through the casing through an opening or passage 9, independent of the latter and larger than said stem, to provide an annular channel of tapering form extending entirely through the casing, and said stem-bar operates as a valve to close said opening or passage (as it extends entirely through the latter) whenever the stem is thrown outwardly and the valve opened by the water-pressure, as hereinafter described. Any other style of valve mechanism operated by the sliding of the valve-stem to close this opening may be used without departing from the spirit of my invention. This opening, being larger than the valve-stem, when the water-valve is closed operates as a drip to permit the water which from any cause accumulates in the water-chamber to drain off into the drip-cup 10, and 11 is a pipe to carry it off. The outlet-pipe leading to the piping system is coupled onto the tubular boss 12, which opens into the air-chamber.

The head 13, which closes the top of the casing, is provided with inward fingers 14 of such length that they will engage with the valve 2 when it is opened and in such manner as to leave the fingers on the valve still in engagement with the opening through the diaphragm. Upon the opposite side of the casing from the offset 4 and boss 12 I secure an arm 15, provided with a slotted stud 16, of non-corrosive metal, and with a transverse knife-edged bearing 17, of non-corrosive metal, mounted upon its outer end.

An arm 18 is secured to the casing at or near its bottom and is slotted longitudinally in its outer end and provided with a pin 19 across said slot, and 20 is a weighted bar having one end adapted to detachably hook over and swing vertically upon said pin. This bar is provided with a hook 21, projecting above its upper side, with a weight enlargement 22, and a stud 23, projecting from its outer end.

A bar 24 is pivotally connected to the casing at one end, substantially as shown, and 25 is a lever provided with a non-corrosive bearing 26 on its inner end, with a non-corrosive point or knife-edged bearing 27 on its outer end and with a flat non-corrosive bearing 28 upon its lower face near its outer end. This lever has its fulcral bearing upon the knife-edge 17, lies in the slotted stud 16, and the outer end of the bar 24 engages with its inner end. An eye on the upper end of the rod 29 fits over and rests upon the bearing 27, and an eye on its lower end fits over the stud 23 loosely, and 30 is a weight upon this rod.

Between the bar 20 and arm 15 I place the valve-holder 31, provided with a hook 32 on its lower end, engaging with a link 33, which fits over and has its bearing upon the hook 21, and its upper end engages detachably with a shoulder 34 on the under side of the arm 15, and 35 is a set-screw inserted through this valve-holder and engaging with the outer end of the valve-stem.

B is a valve-chamber located alongside the air-chamber and on the opposite side of the casing to the boss 12 and connected by the short direct pipe 36 to the air-chamber, provided with a pressure-gage 37, further provided with a bottom partly open and adapted to be closed by the valve 38, the stem of which passes through the guide-frame 39 and engages with the upper side of the bar 24, holding it in contact with the lever 25, and, through this lever, the rod 29, the bar 20, the valve-holder 31, and the intermediate connections, holds the water-valve closed, all as shown in Fig. 1, when full pressure is on the piping and the water-valve is closed and locked by such pressure.

The valve-chamber B is provided with a petcock 40, by which I can let off air or other pressure when desired, or any water which may enter this chamber. I draw off the water, or most of it, which enters the air-chamber when closed by means of a vent-cock 41, communicating with said chamber, by opening which the water passes off through the pipe 42. The drip-pipe 11 is also connected to this pipe 42.

In Fig. 2 I show the parts of the lever mechanism detached in the position they assume when from any cause the pressure in the piping is reduced below a certain point just as they severally fall apart and become separated, allowing the pressure upon the inlet-pipe to open the water-valve and the valve in the bottom of the air-chamber and showing the valve on the stem of the water-valve closing the drip opening or passage in the casing, all accomplished automatically by the reduction of the pressure upon the piping system.

As shown in Fig. 1, an air or other pressure of ten pounds in the pipes of the system will counteract a pressure of sixty pounds upon the water-main. The air-pressure can be put upon the piping and automatically maintained by means of what are commonly known as "beer-pumps," or by any other means desired.

It will be seen that my lever system between the chamber B and the stem of the induction-valve is composed of levers and other parts, none of which are hinged to another part or positively connected to any joint at all liable to stick from corrosion, and thus become inoperative, and that consequently all of the pieces composing my lever system for holding said valve closed when the pressure is reduced, as aforesaid, will automatically fall apart and become released from each other and so release said valve, no matter how much they have been exposed to corrosive influences nor the period thereof.

What I claim as my invention, and desire to secure by Letters Patent, is—

1. The combination, with the inlet-valve and its stem, of the arm upon the casing, the bar 24, pivotally connected to the casing, the lever 25, having its fulcral bearing upon said arm, the rod 29, dependent from said lever, the bar 20, connected to said rod and having a swinging connection to the casing, and the valve-holder 31, engaging with the bar 20 and with said arm and adjustably engaging with the end of the valve-stem projecting beyond the casing.

2. The combination of a casing having a water-chamber, a valve-stem opening or passage, and an offset formed with a main-valve opening, the main valve having arms by which it is supported in its opening while in its closed and open positions, the valve-stem having a valve thereon and connected with the main valve at its inner end, and means located at the outer end of the valve-stem for supporting the valve-stem independently of the valve-stem opening or passage, so as to provide an annular channel around the valve-stem for the free exit of water while the valve is closed, substantially as described.

3. The combination of a casing having a water-chamber, a valve-stem opening or passage, and an offset formed with a main-valve opening, the main valve having arms by which it is supported in its opening while in its closed and open positions, the valve-stem having a valve thereon and loosely connected with the main valve at its inner end, and means located at the outer end of the valve-stem for supporting the valve-stem independently of the valve-stem opening or passage, so as to provide an annular channel around the valve-stem for the free exit of water while the main valve is closed, substantially as described.

4. The combination of a casing having a water-chamber, a valve-stem opening or passage, and an offset formed with a main-valve opening, the main valve, the valve-stem extending through the stem opening or passage, the upper and lower arms secured to the casing, respectively, above and beneath the valve-stem, the lever fulcrumed to the upper arm, the pivoted bar having its outer end bearing on the inner end of the lever, a weighted bar having its inner end resting on the lower arm, a rod coupling the outer ends of the lever and the weighted bar, the valve-holder supported between the weighted bar and the upper arm, and means for holding the pivoted bar in contact with the lever and retaining the valve mechanism in position until released, substantially as described.

5. The combination of the casing having a water-chamber, a valve-stem opening or passage, and an offset formed with a main-valve opening, the main valve, the valve-stem extending through the stem opening or passage, the upper and lower arms secured to the casing, respectively, above and beneath the valve-stem, the lever fulcrumed to the upper arm, the pivoted bar having its outer end bearing on the inner end of the lever, a weighted bar having its inner end resting on the lower arm, a rod coupling the outer ends of the lever and the weighted bar, the valve-holder supported between the weighted bar and the upper arm, and the pressure-chamber having a valve-opening and a guide-frame located at the bottom thereof, and a valve closing the valve-opening, having a stem depending therefrom guided in the frame and resting on the pivoted bar for holding the latter in contact with the lever and retaining the valve mechanism in position until released, substantially as described.

6. The combination of the casing having a partition formed with a valve-opening and dividing the casing into an upper air-chamber and a lower water-chamber, a valve sliding in the partition-opening, a pressure-chamber having a valve-opening and a guide-frame located at the bottom thereof, a valve closing the valve-opening in the pressure-chamber, having a stem depending therefrom and guided in the frame, a short pipe forming a direct connection between the air and pressure chambers, a pivoted arm on which the valve of the pressure-chamber is supported, the water-valve having a stem extending through the casing, and the lever mechanism intermediate of the pivoted bar and the stem of the water-valve for holding the water-valve to its seat until the valve of the pressure-chamber is lifted to release the lever mechanism, the valve of the pressure-chamber dropping again to its seat as soon as the lever mechanism is disconnected, substantially as described.

7. The combination of the casing having a partition formed with a valve-opening and dividing the casing into an upper air-chamber and a lower water-chamber, a valve sliding in the partition-opening, a pressure-chamber having a valve-opening and a guide-frame located at the bottom thereof, a valve closing the valve-opening in the pressure-chamber, having a stem depending therefrom and guided in the frame, a short pipe forming a direct connection between the air and pressure chambers, a pivoted arm on which the valve of the pressure-chamber is supported, the water-valve having a stem extending through the casing, the upper and lower arms secured to the casing, respectively, above and beneath the water-valve stem, the lever fulcrumed to the upper arm, having the outer end of the pivoted bar bearing on the inner end thereof, a weighted bar having its inner end resting on the lower arm, a rod coupling the outer ends of the lever and the weighted bar, and the water-valve holder supported between the weighted bar and the upper arm, substantially as described.

In witness whereof I have hereunto set my hand this 11th day of December, 1890.

ROBT. WOOD.

In presence of—
H. P. DENISON,
C. W. SMITH.